US012480352B2

(12) United States Patent
Eom

(10) Patent No.: US 12,480,352 B2
(45) Date of Patent: Nov. 25, 2025

(54) POWER SLIDING DOOR ACTUATOR

(71) Applicant: PHA CO., LTD., Daegu (KR)

(72) Inventor: Hyeon Soo Eom, Daegu (KR)

(73) Assignee: PHA CO., LTD., Daegu (KR)

( * ) Notice: Subject to any disclaimer, the term of this patent is extended or adjusted under 35 U.S.C. 154(b) by 0 days.

(21) Appl. No.: 17/983,395

(22) Filed: Nov. 9, 2022

(65) Prior Publication Data

US 2023/0272660 A1 Aug. 31, 2023

Related U.S. Application Data

(63) Continuation of application No. PCT/KR2022/002879, filed on Feb. 28, 2022.

(51) Int. Cl.
*E05F 15/627* (2015.01)

(52) U.S. Cl.
CPC ....... *E05F 15/627* (2015.01); *E05Y 2800/404* (2013.01)

(58) Field of Classification Search
CPC .............................. E05F 15/627; E05F 15/643
See application file for complete search history.

(56) References Cited

U.S. PATENT DOCUMENTS 3,367,633 A * 2/1968 Kratzer .................... B66D 1/28 254/362
4,310,146 A * 1/1982 F'Geppert ................ B66D 1/22 475/329
5,711,112 A * 1/1998 Barten .................. E05F 15/643 49/118
2001/0029219 A1* 10/2001 Minegishi ............. E05F 15/643 475/183
2013/0326957 A1* 12/2013 Djordjevic ............ E05F 15/632 49/31
2014/0047770 A1* 2/2014 Vaknin ...................... E05C 1/08 49/352
2016/0024833 A1* 1/2016 Miller .................. E05F 15/643 49/404
2016/0348768 A1* 12/2016 Urano .................... H02K 7/116
2021/0213811 A1 7/2021 Ishigaki
2022/0136314 A1* 5/2022 Gokan ..................... B60J 5/047 49/324

FOREIGN PATENT DOCUMENTS

EP 0723887 B1 9/1999
EP 1020310 A1 7/2000
GB 2503991 * 1/2014
JP 2008-006849 A 1/2008
JP 2019-044533 A 3/2019
WO WO 2015194333 * 12/2015
WO WO 2020237356 * 12/2020

OTHER PUBLICATIONS

European Search Report of European Patent Application No. 220800051.9 dated Apr. 5, 2024.

* cited by examiner

*Primary Examiner* — Gregory J Strimbu
(74) *Attorney, Agent, or Firm* — Revolution IP, PLLC

(57) ABSTRACT

A power sliding door actuator includes an actuator unit including a motor, a gear configured to amplify torque caused by the motor, a drum provided to be rotatable by the gear, and a cable configured to move according to rotation of the drum and open or close a door, a tensioner unit configured to provide a restoration force to the actuator unit, and a housing unit configured to provide a path along which the actuator unit moves.

7 Claims, 6 Drawing Sheets

POWER SLIDING DOOR ACTUATOR

TECHNICAL FIELD

The present disclosure relates to a power sliding door actuator, and more particularly, to a power sliding door actuator that is modularized, thus being easy to manufacture, install, and manage.

BACKGROUND ART

Various methods may be applied to opening and closing of doors, and in the case of a sliding door, space for opening and closing the door may be minimized, and thus available space may be increased.

In particular, in the case of a sliding door for vehicles, although the sliding door enables multiple passengers to simultaneously get in or out of a vehicle, opening and closing of the door may be difficult in a specific environment in a case in which a passenger manually operates the opening and closing of the door. In order to satisfy various usage environments or needs, a power sliding door has been developed.

However, the conventional power sliding door has problems that, due to a large number of components of a device constituting the power sliding door, difficulty occurs in assembling, and manufacturing costs increase.

DISCLOSURE

Technical Problem

The present disclosure has been devised to address the above-mentioned problems of the related art and is directed to providing a power sliding door actuator that is modularized.

Objectives of the present disclosure are not limited to the above-mentioned objective, and other unmentioned objectives should be clearly understood by those of ordinary skill in the art from the description below.

Technical Solution

A power sliding door actuator of the present disclosure for achieving the above objectives may include: an actuator unit in which a motor, a gear configured to amplify torque caused by the motor, a drum provided to be rotatable by the gear, and a cable configured to move according to rotation of the drum and open or close a door are provided; a tensioner unit configured to provide a restoration force to the actuator unit; and a housing unit configured to provide a path along which the actuator unit moves.

Here, the actuator unit may include a cover portion provided on an outer side of the drum to prevent foreign matter from entering the drum.

Here, the cover portion may include a first cover provided to be spaced a predetermined distance apart from a circumference of the drum and a second cover provided to protrude from the first cover toward an outer side of the housing unit.

Here, the second cover may include a packing member provided on an inner side to prevent foreign matter from entering according to movement of the cable.

Also, the drum may rotate at the same angular velocity as the gear.

Alternatively, the drum may have a groove formed therein to prevent the cable from falling.

Alternatively, the actuator unit may include a rotation support portion configured to induce the rotation of the drum.

Alternatively, the tensioner unit may have a portion fixed to the housing unit.

Alternatively, the housing unit may include a guide portion configured to provide a path to allow the actuator unit to be coupled and reciprocate in a certain direction.

Here, the guide portion may include a first guide provided on one surface of the housing unit and a second guide formed to face the first guide.

Also, the housing unit may include a fastening member formed outward to facilitate coupling in the door.

Advantageous Effects

A power sliding door actuator of the present disclosure for addressing the above objectives has the following advantageous effects.

First, since it is possible to modularize and miniaturize the power sliding door actuator, it is easy to manufacture, install, and manage the power sliding door actuator.

Second, it is possible to maintain tension of a cable and ensure consistent door opening/closing performance with a simple configuration.

The advantageous effects of the present disclosure are not limited to the above-mentioned advantageous effects, and other unmentioned advantageous effects should be clearly understood by those of ordinary skill in the art from the claims below.

MODES OF THE INVENTION

Figure 1:
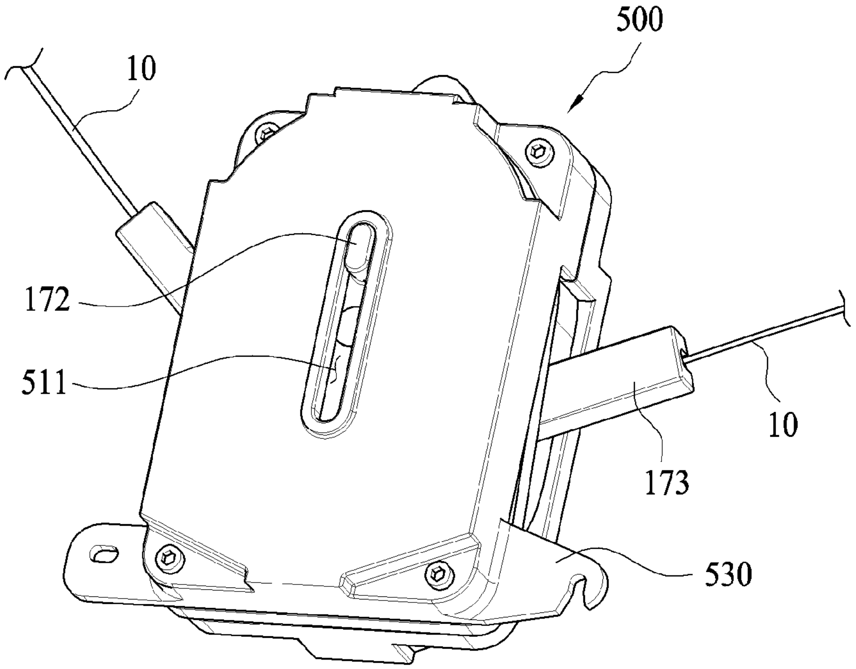
FIG. 1 is a front perspective view of a power sliding door actuator of the present disclosure.

Hereinafter, exemplary embodiments of the present disclosure that can specifically realize the objectives of the present disclosure will be described with reference to the accompanying drawings. In describing the present embodiments, the same names and the same reference numerals will be used for the same elements, and additional description thereof will be omitted.

Also, in describing the embodiments of the present disclosure, it should be noted in advance that, for elements having the same function, the same names and the same reference numerals are used, but the elements are not substantially completely the same as those in the related art.

Also, terms used in the embodiments of the present disclosure are only used to describe specific embodiments and are not intended to limit the present disclosure. A singular expression includes a plural expression unless the context clearly indicates otherwise.

Also, in the embodiments of the present disclosure, terms such as "include" or "have" should be understood as designating that features, number, steps, operations, elements, parts, or combinations thereof exist and not as precluding the possibility of existence or addition of one or more other features, numbers, steps, operations, elements, parts, or combinations thereof in advance.

The following description of a power sliding door actuator of the present disclosure is given in relation to a vehicle only for convenience of description, and the use of the power sliding door actuator of the present disclosure is not limited thereto. It is self-evident to those of ordinary skill in the art that the power sliding door actuator of the present disclosure may be applied to various sliding doors requiring automatic opening and closing other than a door of a vehicle, such as a door installed in a building.

Figure 2:
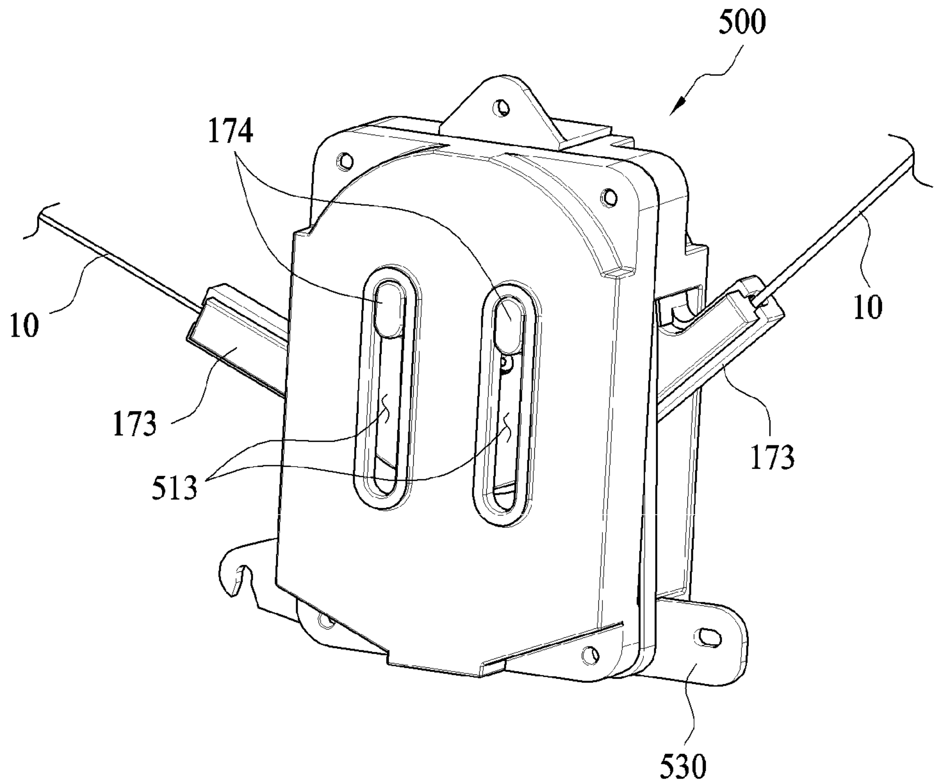
FIG. 2 is a rear perspective view of the power sliding door actuator of the present disclosure.
Figure 3:
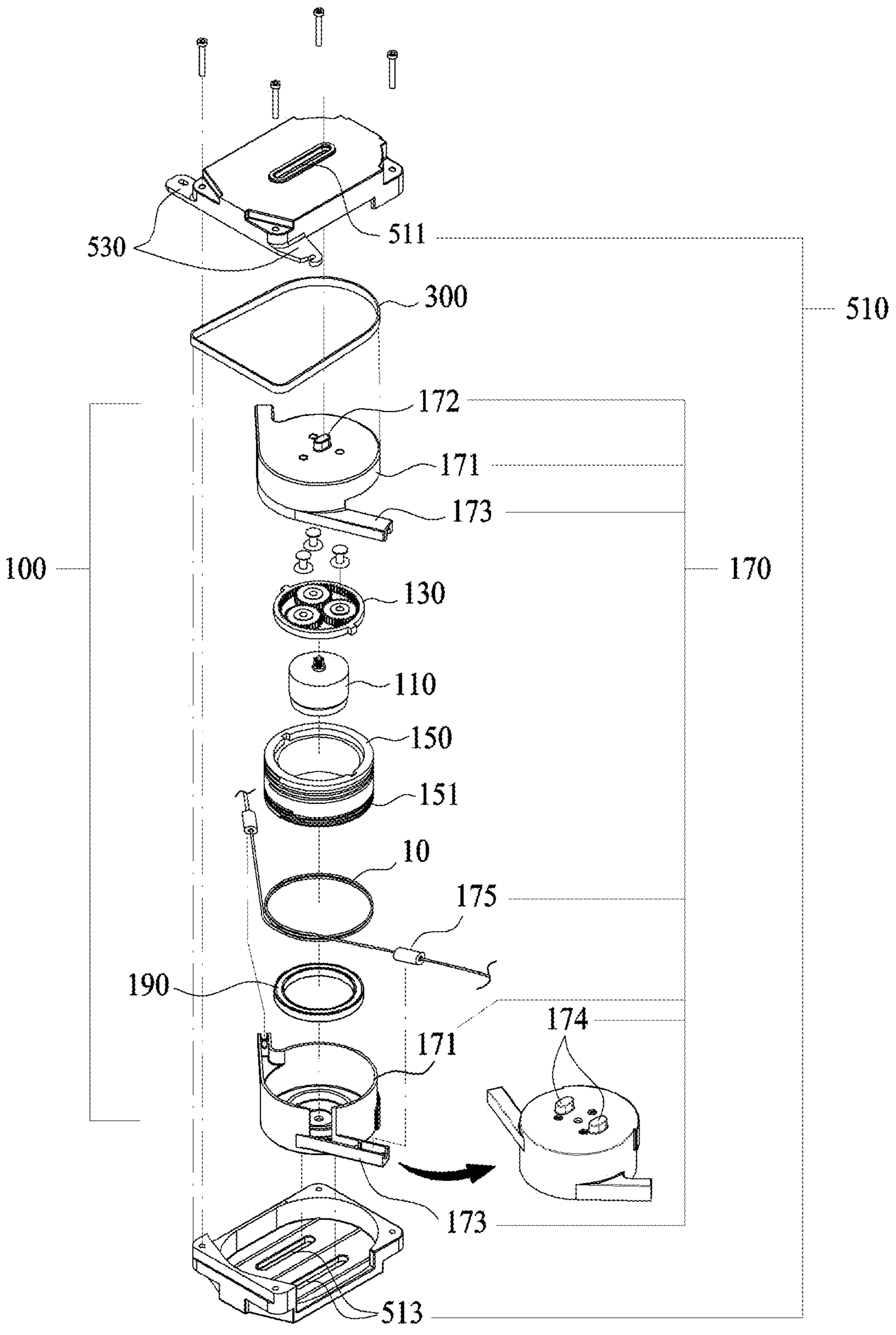
FIG. 3 is an exploded view of the power sliding door actuator of the present disclosure.

The power sliding door actuator of the present disclosure will be described with reference to FIGS. 1 to 4. FIG. 1 is a front perspective view of a power sliding door actuator of the present disclosure, and FIG. 2 is a rear perspective view of the power sliding door actuator of the present disclosure. FIGS. 3 and 4 are exploded views of the power sliding door actuator of the present disclosure.

The power sliding door actuator of the present disclosure may include an actuator unit 100, a tensioner unit 300, and a housing unit 500.

The actuator unit 100 may include a motor 110, a gear 130 configured to amplify torque caused by the motor 110, a drum 150 provided to be rotatable by the gear 130, and a cable 10 configured to move according to rotation of the drum 150 and open or close a door.

The motor 110 is an element that generates a driving force, and a brushless DC (BLDC) motor 110 may be used as the motor 110. However, the motor 110 is not limited thereto, and of course, various other motors 110 may be applied as the motor 110.

The gear 130 is an element that amplifies the torque caused by the motor 110, and a planetary gear 130 may be used as the gear 130. However, the gear 130 is not limited thereto, and of course, various other gears 130 may be applied as the gear 130.

The drum 150 may be provided to surround at least a portion of a circumference of the motor 110 or the gear 130 and be rotatable by the gear 130.

Here, the drum 150 may rotate at the same angular velocity as the gear 130. Specifically, a portion of an outer side of the gear 130 may protrude, and a groove or a hole may be formed in the drum 150 so that the protruding portion of the gear 130 may be inserted thereinto. Alternatively, a portion of an inner side of the drum 150 may protrude, and a groove or a hole may be formed in the gear 130 so that the protruding portion of the drum 150 may be inserted thereinto.

The cable 10 may have a portion wound around the drum 150 and have one end portion or both end portions connected to the door to open or close the door in a direction in which the drum 150 rotates. A groove 151 may be formed in the drum 150 to allow the cable 10 to, without falling from the drum 150, smoothly open or close the door in the direction in which the drum 150 rotates.

Also, the actuator unit 100 may include a cover portion 170 and a rotation support portion 190.

The cover portion 170 may be provided on an outer side of the drum 150 to prevent foreign matter from entering the drum 150 and causing a failure.

Here, the cover portion 170 may include a first cover 171 provided to be spaced a predetermined distance apart from the circumference of the drum 150 and a second cover 173 provided to extend from the first cover 171 and protrude toward an outer side of the housing unit 500.

Specifically, the first cover 171 may provide a certain space to allow the drum 150 to be seated and may be coupled to the housing unit 500 to reciprocate within a certain distance. In order to be coupled to the housing unit 500, the first cover 171 may have a first protruding member 172 formed by an upper end portion of the first cover 171 protruding in an axial direction of the drum 150 and a second protruding member 174 formed by a lower end portion of the first cover 171 protruding. However, the protruding members are only examples, and elements that allow the first cover 171 to be coupled to the housing unit 500 may be formed in various other ways.

That is, the first cover 171 prevents foreign matter from entering the drum 150 and simultaneously enables rotation and linear motion of the drum 150 according to opening and closing of the door. A mechanism relating thereto will be described below.

The second cover 173 may be formed so that one end portion communicates with the first cover 171 and the other end portion extends toward the outer side of the housing unit 500 in a certain direction.

Here, the second cover 173 may include a packing member 175 provided on an inner side to prevent foreign matter from entering according to movement of the cable 10.

The packing member 175 may be provided to remove foreign matter formed on a surface of the cable 10 due to an operation of the cable 10. Specifically, the packing member 175 may be formed in a cylindrical shape and provided to surround a portion of an outer side surface of the cable 10. Alternatively, the packing member 175 may be filled with a material such as rubber to surround a portion of the outer side surface of the cable 10 inward on an end portion of the second cover 173. However, the shape, material, position, and the like of the packing member 175 are not limited to the above and may vary.

Also, the rotation support portion 190 is an element that induces rotation of the drum 150 and may be provided as a bearing, a bush, or the like and disposed on a lower end portion of the motor 110 to help position alignment of the drum 150 in the first cover 171 and smooth rotation of the drum 150.

The tensioner unit 300 may provide a restoration force to the actuator unit 100.

The tensioner unit 300 may be provided as an elastic body such as a band or a spring. The tensioner unit 300 may be formed as various other elements as long as the element can provide a restoration force or an elastic force to the actuator unit 100.

Here, the tensioner unit 300 may have a portion fixed to the housing unit 500. Specifically, the tensioner unit 300 may surround the first cover 171 while fixed to the housing unit 500 to provide a restoration force while the first cover 171 reciprocates in the housing unit 500.

Also, the housing unit 500 may provide a path along which the actuator unit 100 is coupled to an inner portion of the housing unit 500 and the actuator unit 100 moves in a certain direction.

Here, the housing unit 500 may include a guide portion 510 and a fastening member 530.

The guide portion 510 may include a first guide 511 and a second guide 513 to provide a path along which the actuator unit 100 may be coupled and reciprocate in a certain direction.

The first guide 511 may have a hole provided in one surface of the housing unit 500, and the second guide 513 may face the first guide 511 and have a hole formed therein. Specifically, the first protruding member 172 and the second protruding member 174 formed on the first cover 171 may be coupled to the first guide 511 and the second guide 513, respectively, and reciprocate along the first guide 511 and the second guide 513. However, it is self-evident that the shape or configuration of the first guide 511 and the second guide 513 may vary as long as the first guide 511 and the second guide 513 provide a path along which the first cover 171 may reciprocate.

Also, the fastening member 530 is formed outward to facilitate coupling and may be provided as a hook, a hole, or the like. Specifically, the fastening member 530 is an element formed to facilitate coupling to an element other than the door and allows the power sliding door actuator of the present disclosure to be stably installed at a specific position.

To sum up the coupling relationship between the elements of the power sliding door actuator of the present disclosure described above, as illustrated in FIGS. 4B and 4C, three planetary gears are disposed within the inner cavity of the main gear body and equidistantly spaced in a triangular configuration, each of the planetary gears meshes with the inner toothed surface of the main gear body, the motor 110 may be coupled to the gear 130, and the gear 130 may be coupled to the drum 150 so that the drum 150 rotates at the same angular velocity as the gear 130. Also, for smooth rotation of the drum 150, the rotation support portion 190 may be provided on a lower end of the motor 110.

Figure 4A:
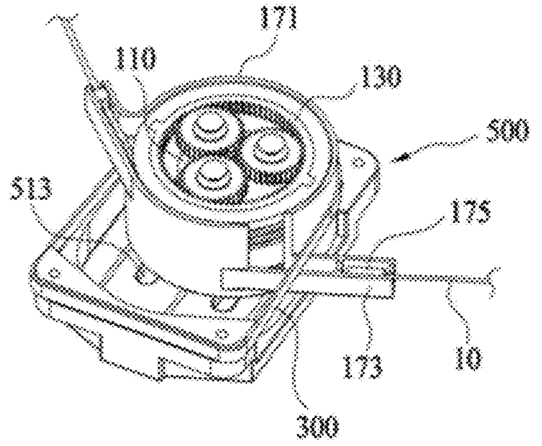
FIGS. 4A, 4B and 4C are detailed views of the power sliding door actuator of the present disclosure.
Figure 4B:
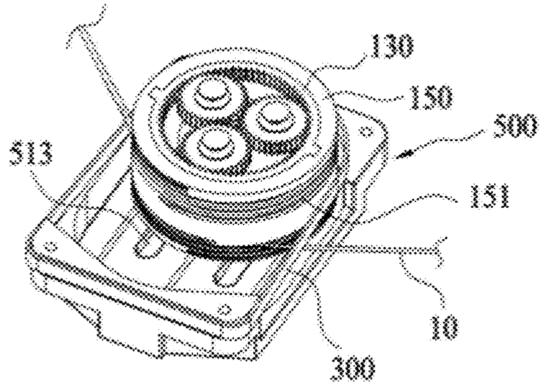
Figure 4C:
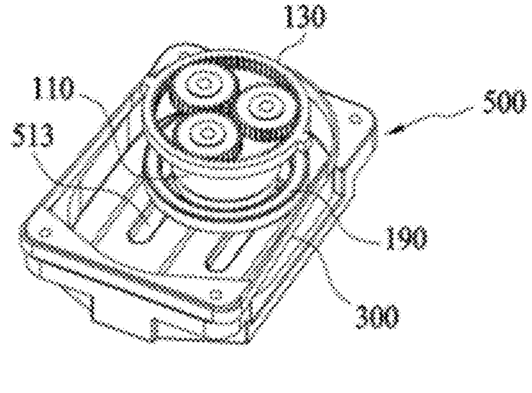

Also, as illustrated in FIG. 4A, the drum 150 may be surrounded by the first cover 171, and the first protruding member 172 or the second protruding member 174 formed on the first cover 171 may be configured to be coupled to the first guide 511 or the second guide 513 of the housing unit 500.

In this way, since the power sliding door actuator of the present disclosure can be modularized, it is easy to install the power sliding door actuator, and since the module itself may be replaced when a failure occurs, prompt maintenance and repair are possible.

Figure 5A:
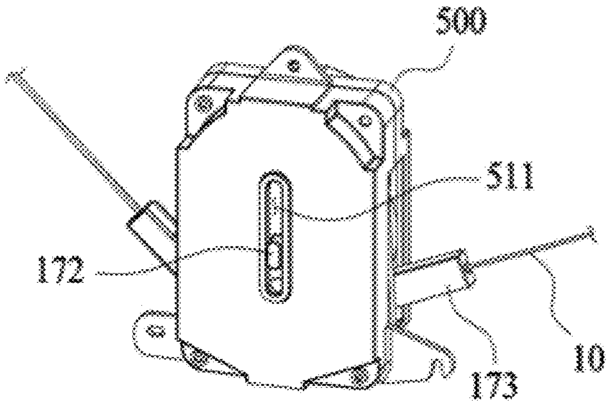
FIGS. 5A, 5B and 5C are views illustrating a sequence of operation of the power sliding door actuator of the present disclosure from the front.
Figure 5B:
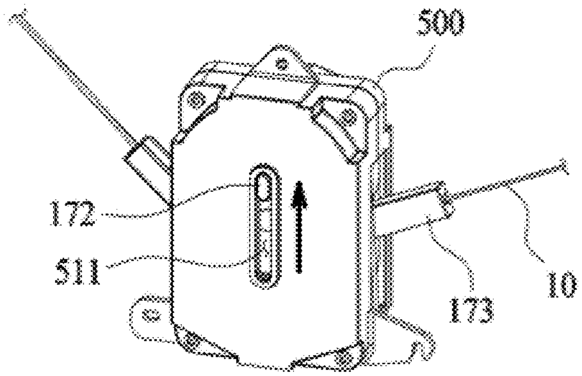
Figure 5C:
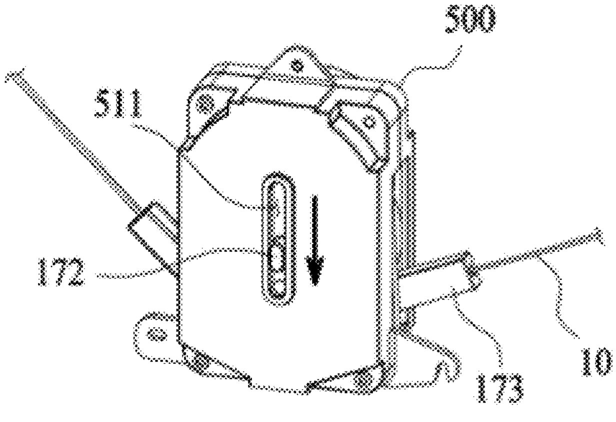
Figure 6A:
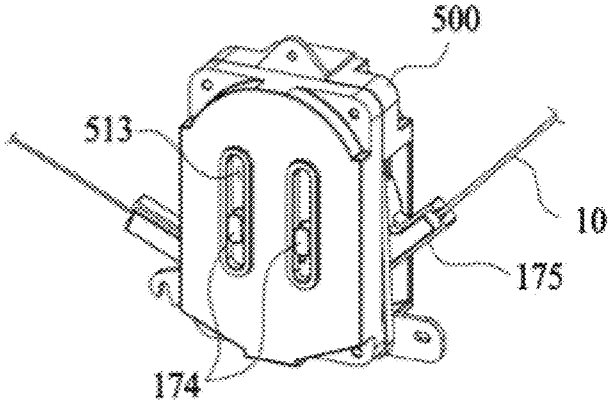
FIGS. 6A, 6B and 6C are views illustrating the sequence of operation of the power sliding door actuator of the present disclosure from the rear.
Figure 6B:
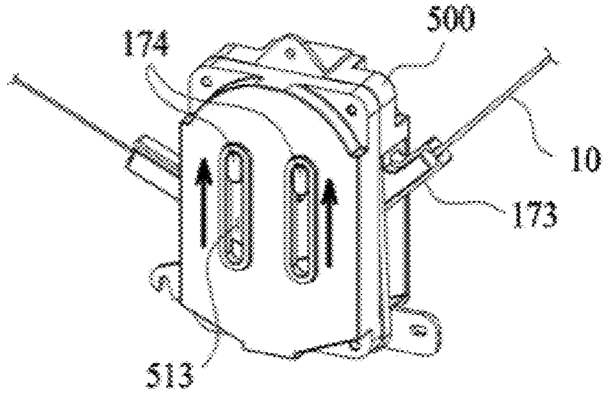
Figure 6C:
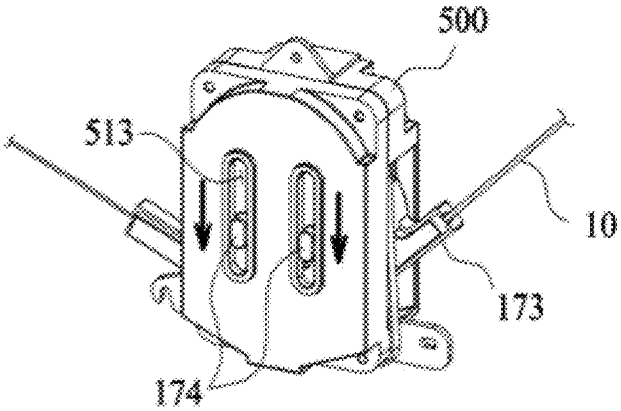

The mechanism of the power sliding door actuator of the present disclosure will be described with reference to FIGS. 5 and 6. FIG. 5 is a view illustrating a sequence of operation of the power sliding door actuator of the present disclosure from the front. Also, FIG. 6 is a view illustrating the sequence of operation of the power sliding door actuator of the present disclosure from the rear.

In a neutral state in which the door is neither open nor closed, the first cover 171 is positioned on a specific portion of the guide portion 510.

Also, in a process of opening or closing the door, due to a force pulling the door, the first cover 171 moves to a position at which the first protruding member 172 or the second protruding member 174 comes in contact with one end portion of the first guide 511 or the second guide 513. Also, when the opening or closing of the door is completed, the first cover 171 moves to the initial neutral position due to a restoration force provided by the tensioner unit 300.

Due to the tensioner unit 300, the actuator unit 100 may be disposed at a specific position in the neutral state, and thus the cable 10 may maintain tension. In this way, consistent door opening/closing performance can be ensured.

Exemplary embodiments according to the present disclosure have been described above, and it should be self-evident to those of ordinary skill in the art that the present disclosure may be embodied in other specific forms, different from the embodiments described above, without departing from the gist or scope of the present disclosure. Therefore, the above-described embodiments should be considered illustrative rather than limiting, and accordingly, the present disclosure is not limited to the above description and may be changed within the scope of the appended claims or a scope equivalent thereto.

DESCRIPTION OF REFERENCE NUMERALS

10: cable
100: actuator unit
110: motor
130: gear
150: drum
151: groove
170: cover portion
171: first cover
172: first protruding member
173: second cover
174: second protruding member
175: packing member
190: rotation support portion
300: tensioner unit
500: housing unit
510: guide portion
511: first guide
513: second guide
530: fastening member

The invention claimed is:

1. A power sliding door actuator comprising:
an actuator unit comprising a motor, a gear configured to amplify torque caused by the motor, a drum having a flat top end, a flat bottom end, and a cylindrical section connecting the flat top and bottom ends and being provided to be rotatable by the gear, and a cable configured to move according to rotation of the drum and open or close a door,
wherein the drum is provided to surround a circumference of the motor and the gear;
a tensioner unit configured to provide a restoration force to the actuator unit; and
a housing unit configured to provide a path along which the actuator unit moves,
wherein the gear includes:
a main gear body having a circular outer periphery with an inner toothed surface and an inner cavity; and
three planetary gears disposed within the inner cavity of the main gear body, wherein
the three planetary gears are equidistantly spaced in a triangular configuration, and
each of the three planetary gears meshes with the inner toothed surface of the main gear body,
wherein the actuator unit includes a cover portion having an inner space to accommodate the flat top end, the flat bottom end, and the cylindrical section of the drum therein to prevent foreign matter from coming into contact with the drum,
wherein the cover portion includes:
a first cover provided to be spaced a predetermined distance apart from a circumference of the drum; and
a second cover provided to protrude from the first cover toward an outer side of the housing unit, the second cover having two openings positioned at opposite areas adjacent to the cylindrical section of the drum, each of the two openings of the second cover configured to allow the cable to extend outwardly from the first cover, enabling movement of the door, wherein the drum has a groove formed therein, wherein the groove is configured to prevent the cable from falling off of the drum, and wherein the cable includes:

a central portion wound around the drum along the groove; and a first end and a second end that extend outwardly through the two openings in the second cover, and are connected to the door to facilitate opening or closing of the door, wherein the tensioner unit has a portion fixed to the housing unit and surrounds the first cover while the portion of the tensioner unit is fixed to the housing unit, wherein the tensioner unit is made of an elastic band or a spring.

2. The power sliding door actuator of claim 1, wherein the second cover includes a packing member provided on an inner side of the second cover to prevent the foreign matter from entering the actuator unit due to movement of the cable.

3. The power sliding door actuator of claim 1, wherein the drum rotates at the same angular velocity as the main gear body of the gear.

4. The power sliding door actuator of claim 1, wherein the actuator unit further comprises a rotation support portion configured to support the drum.

5. The power sliding door actuator of claim 1, wherein the housing unit includes a guide portion having a predetermined shape, wherein the guide portion is configured to allow coupling with the actuator unit and to guide the actuator unit to reciprocate linearly in two predetermined directions in which one of the two predetermined directions is opposite to the other one of the two predetermined directions along an axis defined by the guide portion.

6. The power sliding door actuator of claim 5, wherein the guide portion includes:

a first guide provided on one surface of the housing unit; and a second guide formed to face the first guide.

7. The power sliding door actuator of claim 1, wherein the housing unit includes a fastening member protruding outward from the housing unit.

* * * * *